(12) United States Patent
Szabo et al.

(10) Patent No.: US 9,130,846 B1
(45) Date of Patent: Sep. 8, 2015

(54) EXPOSED CONTROL COMPONENTS FOR CUSTOMIZABLE LOAD BALANCING AND PERSISTENCE

(75) Inventors: Paul I. Szabo, Seattle, WA (US);
Nathan McMahon, San Jose, CA (US);
David A. Hansen, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 543 days.

(21) Appl. No.: 12/199,768

(22) Filed: Aug. 27, 2008

(51) Int. Cl.
*G06F 15/173* (2006.01)
*H04L 12/24* (2006.01)
*G06F 21/60* (2013.01)
*G06F 21/62* (2013.01)

(52) U.S. Cl.
CPC .......... *H04L 41/0893* (2013.01); *G06F 21/604* (2013.01); *G06F 21/6218* (2013.01)

(58) Field of Classification Search
CPC ... G06F 21/6218; G06F 21/604; G06F 9/465; G06Q 10/10; G06Q 10/06; H04L 41/0893; H04L 63/102
USPC ............ 709/226, 223; 340/1.1–16.1; 710/36, 710/107; 711/150
See application file for complete search history.

(56) References Cited

U.S. PATENT DOCUMENTS

| | | | |
|---|---|---|---|
| 3,689,872 A | 9/1972 | Sieracki | |
| 3,768,726 A | 10/1973 | Hale et al. | |
| 5,319,638 A | 6/1994 | Lin | |
| 5,553,242 A | 9/1996 | Russell et al. | |
| 5,610,905 A | 3/1997 | Murthy et al. | |
| 5,825,890 A | 10/1998 | Elgamal et al. | |
| 5,898,837 A | 4/1999 | Guttman et al. | |
| 5,941,988 A | 8/1999 | Bhagwat et al. | |
| 6,023,722 A | 2/2000 | Colyer | |
| 6,052,785 A | 4/2000 | Lin et al. | |
| 6,061,454 A | 5/2000 | Malik et al. | |
| 6,182,139 B1 | 1/2001 | Brendel | |
| 6,223,287 B1 | 4/2001 | Douglas et al. | |
| 6,226,687 B1 | 5/2001 | Harriman et al. | |
| 6,253,226 B1 | 6/2001 | Chidambaran et al. | |
| 6,298,380 B1 | 10/2001 | Coile et al. | |
| 6,367,009 B1 | 4/2002 | Davis et al. | |
| 6,370,584 B1 | 4/2002 | Bestavros et al. | |
| 6,411,986 B1 | 6/2002 | Susai et al. | |
| 6,434,618 B1 | 8/2002 | Cohen et al. | |

(Continued)

OTHER PUBLICATIONS

"Consistent Hashing," Wikipedia—the free encyclopedia, 1 page, http://en.wikipedia.org/w/index.php?title=Consistent_hashing &print . . . (accessed Jul. 25, 2008).

(Continued)

*Primary Examiner* — Phuoc Nguyen
*Assistant Examiner* — Davoud Zand
(74) *Attorney, Agent, or Firm* — John W. Branch; Lowe Graham Jones PLLC

(57) ABSTRACT

Embodiments are directed towards exposing access to network metrics to a late binding user customized set of computer instructions within a traffic manager device (TMD) for use in managing a request for a resource. In one embodiment, the TMD may be interposed between client devices and a plurality of network devices. Request specific data is extracted from a client request received by the user's instructions. Various network metrics about the network devices are provided to the user's instructions to selectively provide the request from the client device to a network device. In one embodiment, an election hash is described as an action performed by the user's instructions.

19 Claims, 8 Drawing Sheets

(56) References Cited

U.S. PATENT DOCUMENTS

| | | |
|---|---|---|
| 6,584,567 B1 | 6/2003 | Bellwood et al. |
| 6,590,588 B2 | 7/2003 | Lincke et al. |
| 6,629,163 B1 | 9/2003 | Balassanian |
| 6,643,701 B1 | 11/2003 | Aziz et al. |
| 6,650,640 B1 | 11/2003 | Muller et al. |
| 6,654,701 B2 | 11/2003 | Hatley |
| 6,668,327 B1 | 12/2003 | Prabandham et al. |
| 6,674,717 B1 | 1/2004 | Duong-van et al. |
| 6,681,327 B1 | 1/2004 | Jardin |
| 6,697,363 B1 | 2/2004 | Carr |
| 6,718,388 B1 | 4/2004 | Yarborough et al. |
| 6,754,662 B1 | 6/2004 | Li |
| 6,754,831 B2 | 6/2004 | Brownell |
| 6,760,782 B1 | 7/2004 | Swales |
| 6,763,384 B1 | 7/2004 | Gupta et al. |
| 6,766,373 B1 | 7/2004 | Beadle et al. |
| 6,768,716 B1 | 7/2004 | Abel et al. |
| 6,768,726 B2 | 7/2004 | Dorenbosch et al. |
| 6,789,203 B1 | 9/2004 | Belissent |
| 6,792,461 B1 | 9/2004 | Hericourt |
| 6,799,276 B1 | 9/2004 | Belissent |
| 6,829,238 B2 | 12/2004 | Tokuyo et al. |
| 6,831,923 B1 | 12/2004 | Laor et al. |
| 6,842,462 B1 | 1/2005 | Ramjee et al. |
| 6,842,860 B1 | 1/2005 | Branstad et al. |
| 6,845,449 B1 | 1/2005 | Carman et al. |
| 6,854,117 B1 | 2/2005 | Roberts |
| 6,895,443 B2 | 5/2005 | Aiken |
| 6,928,082 B2 | 8/2005 | Liu et al. |
| 6,934,260 B1 | 8/2005 | Kanuri |
| 6,934,848 B1 | 8/2005 | King et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,990,592 B2 | 1/2006 | Richmond et al. |
| 7,023,804 B1 | 4/2006 | Younes et al. |
| 7,047,315 B1 | 5/2006 | Srivastava |
| 7,051,330 B1 | 5/2006 | Kaler et al. |
| 7,068,640 B2 | 6/2006 | Kakemizu et al. |
| 7,069,438 B2 | 6/2006 | Balabine et al. |
| 7,092,727 B1 | 8/2006 | Li et al. |
| 7,103,045 B2 | 9/2006 | Lavigne et al. |
| 7,113,993 B1 | 9/2006 | Cappiello et al. |
| 7,127,524 B1 | 10/2006 | Renda et al. |
| 7,139,792 B1 | 11/2006 | Mishra et al. |
| 7,139,811 B2 | 11/2006 | Lev Ran et al. |
| 7,181,493 B2 | 2/2007 | English et al. |
| 7,185,360 B1 | 2/2007 | Anton, Jr. et al. |
| 7,215,637 B1 | 5/2007 | Ferguson et al. |
| 7,231,445 B1 | 6/2007 | Aweya et al. |
| 7,231,657 B2 | 6/2007 | Honarvar et al. |
| 7,254,639 B1 | 8/2007 | Siegel et al. |
| 7,272,651 B1 | 9/2007 | Bolding et al. |
| 7,280,471 B2 | 10/2007 | Rajagopal et al. |
| 7,287,077 B2 | 10/2007 | Haugh et al. |
| 7,313,627 B1 | 12/2007 | Noble |
| 7,315,513 B2 | 1/2008 | McCann et al. |
| 7,321,926 B1 | 1/2008 | Zhang et al. |
| 7,350,229 B1 | 3/2008 | Lander |
| 7,362,762 B2 | 4/2008 | Williams, Jr. et al. |
| 7,366,755 B1 | 4/2008 | Cuomo et al. |
| 7,421,515 B2 | 9/2008 | Marovich |
| 7,463,637 B2 | 12/2008 | Bou-Diab et al. |
| 7,484,011 B1 | 1/2009 | Agasaveeran et al. |
| 7,496,750 B2 | 2/2009 | Kumar et al. |
| 7,571,313 B2 | 8/2009 | Messerges et al. |
| 7,586,851 B2 | 9/2009 | Panigrahy et al. |
| 7,596,137 B2 | 9/2009 | Bennett |
| 7,619,983 B2 | 11/2009 | Panigrahy |
| 7,623,468 B2 | 11/2009 | Panigrahy et al. |
| 7,624,436 B2 | 11/2009 | Balakrishnan et al. |
| 7,711,857 B2 | 5/2010 | Balassanian |
| 8,009,566 B2 | 8/2011 | Zuk et al. |
| 8,584,131 B2 * | 11/2013 | Wong et al. .................. 718/104 |
| 2001/0032254 A1 | 10/2001 | Hawkins |
| 2001/0049741 A1 | 12/2001 | Skene et al. |
| 2001/0049785 A1 | 12/2001 | Kawan et al. |
| 2002/0025036 A1 | 2/2002 | Sato |
| 2002/0055980 A1 | 5/2002 | Goddard |
| 2002/0057678 A1 | 5/2002 | Jiang et al. |
| 2002/0059428 A1 | 5/2002 | Susai et al. |
| 2002/0073223 A1 | 6/2002 | Darnell et al. |
| 2002/0085587 A1 | 7/2002 | Mascolo |
| 2002/0107903 A1 | 8/2002 | Richter et al. |
| 2002/0126671 A1 | 9/2002 | Ellis et al. |
| 2002/0133586 A1 | 9/2002 | Shanklin et al. |
| 2002/0147916 A1 | 10/2002 | Strongin et al. |
| 2002/0169980 A1 | 11/2002 | Brownell |
| 2003/0018827 A1 | 1/2003 | Guthrie et al. |
| 2003/0043755 A1 | 3/2003 | Mitchell |
| 2003/0050974 A1 | 3/2003 | Mani-Meitav et al. |
| 2003/0061256 A1 | 3/2003 | Mathews et al. |
| 2003/0097484 A1 | 5/2003 | Bahl |
| 2003/0097593 A1 | 5/2003 | Sawa et al. |
| 2003/0110230 A1 | 6/2003 | Holdsworth et al. |
| 2003/0126029 A1 | 7/2003 | Dastidar et al. |
| 2003/0139183 A1 | 7/2003 | Rantalainen |
| 2003/0140230 A1 | 7/2003 | de Jong et al. |
| 2003/0154406 A1 | 8/2003 | Honarvar et al. |
| 2003/0169859 A1 | 9/2003 | Strathmeyer et al. |
| 2003/0172090 A1 | 9/2003 | Asunmaa et al. |
| 2003/0177267 A1 | 9/2003 | Orava et al. |
| 2003/0217171 A1 * | 11/2003 | Von Stuermer et al. ...... 709/231 |
| 2003/0223413 A1 | 12/2003 | Guerrero |
| 2004/0006638 A1 | 1/2004 | Oberlander et al. |
| 2004/0008629 A1 | 1/2004 | Rajagopal et al. |
| 2004/0008664 A1 | 1/2004 | Takahashi et al. |
| 2004/0008728 A1 | 1/2004 | Lee |
| 2004/0010473 A1 | 1/2004 | Hsu et al. |
| 2004/0034773 A1 | 2/2004 | Balabine et al. |
| 2004/0037322 A1 | 2/2004 | Sukonik et al. |
| 2004/0052257 A1 | 3/2004 | Abdo et al. |
| 2004/0083394 A1 | 4/2004 | Brebner et al. |
| 2004/0088585 A1 | 5/2004 | Kaler et al. |
| 2004/0098619 A1 | 5/2004 | Shay |
| 2004/0098620 A1 | 5/2004 | Shay |
| 2004/0107360 A1 | 6/2004 | Herrmann et al. |
| 2004/0148425 A1 | 7/2004 | Haumont et al. |
| 2004/0177276 A1 | 9/2004 | MacKinnon et al. |
| 2004/0193513 A1 | 9/2004 | Pruss et al. |
| 2004/0225810 A1 | 11/2004 | Hiratsuka |
| 2004/0225880 A1 | 11/2004 | Mizrah |
| 2004/0228360 A1 | 11/2004 | Bae et al. |
| 2004/0255243 A1 | 12/2004 | Vincent |
| 2004/0260657 A1 | 12/2004 | Cockerham |
| 2005/0021957 A1 | 1/2005 | Gu |
| 2005/0049934 A1 | 3/2005 | Nakayama et al. |
| 2005/0060295 A1 | 3/2005 | Gould et al. |
| 2005/0063303 A1 | 3/2005 | Samuels et al. |
| 2005/0063307 A1 | 3/2005 | Samuels et al. |
| 2005/0071643 A1 | 3/2005 | Moghe |
| 2005/0074007 A1 | 4/2005 | Samuels et al. |
| 2005/0091513 A1 | 4/2005 | Mitomo et al. |
| 2005/0108420 A1 | 5/2005 | Brown et al. |
| 2005/0132060 A1 * | 6/2005 | Mo et al. ...................... 709/227 |
| 2005/0135436 A1 | 6/2005 | Nigam et al. |
| 2005/0144278 A1 | 6/2005 | Atamaniouk |
| 2005/0154914 A1 | 7/2005 | Eguchi et al. |
| 2005/0160289 A1 | 7/2005 | Shay |
| 2005/0187979 A1 | 8/2005 | Christensen et al. |
| 2005/0193208 A1 | 9/2005 | Charrette et al. |
| 2005/0216555 A1 | 9/2005 | English et al. |
| 2005/0238010 A1 | 10/2005 | Panigrahy et al. |
| 2005/0238011 A1 | 10/2005 | Panigrahy |
| 2005/0238012 A1 | 10/2005 | Panigrahy et al. |
| 2005/0238022 A1 | 10/2005 | Panigrahy |
| 2005/0265235 A1 | 12/2005 | Accapadi et al. |
| 2005/0271048 A1 | 12/2005 | Casey |
| 2005/0278775 A1 | 12/2005 | Ross |
| 2006/0005008 A1 | 1/2006 | Kao |
| 2006/0020598 A1 | 1/2006 | Shoolman et al. |
| 2006/0026290 A1 | 2/2006 | Pulito et al. |
| 2006/0029062 A1 | 2/2006 | Rao et al. |
| 2006/0029063 A1 | 2/2006 | Rao et al. |

(56) References Cited

U.S. PATENT DOCUMENTS

| | | | |
|---|---|---|---|
| 2006/0029064 | A1 | 2/2006 | Rao et al. |
| 2006/0036747 | A1 | 2/2006 | Galvin et al. |
| 2006/0037071 | A1 | 2/2006 | Rao et al. |
| 2006/0041507 | A1 | 2/2006 | Novack et al. |
| 2006/0062228 | A1 | 3/2006 | Ota et al. |
| 2006/0089994 | A1 | 4/2006 | Hayes |
| 2006/0123226 | A1 | 6/2006 | Kumar |
| 2006/0153228 | A1 | 7/2006 | Stahl et al. |
| 2006/0161667 | A1 | 7/2006 | Umesawa et al. |
| 2006/0174332 | A1 | 8/2006 | Bauban et al. |
| 2006/0227802 | A1 | 10/2006 | Du et al. |
| 2006/0233166 | A1 | 10/2006 | Bou-Diab et al. |
| 2006/0235973 | A1 | 10/2006 | McBride et al. |
| 2006/0239503 | A1 | 10/2006 | Petrovic et al. |
| 2006/0242300 | A1 | 10/2006 | Yumoto et al. |
| 2006/0242688 | A1 | 10/2006 | Paramasivam et al. |
| 2006/0265689 | A1 | 11/2006 | Kuznetsov et al. |
| 2006/0276196 | A1 | 12/2006 | Jiang et al. |
| 2006/0288404 | A1 | 12/2006 | Kirshnan et al. |
| 2006/0291402 | A1 | 12/2006 | Yun et al. |
| 2006/0294366 | A1 | 12/2006 | Nadalin et al. |
| 2007/0094336 | A1 | 4/2007 | Pearson |
| 2007/0094714 | A1 | 4/2007 | Bauban et al. |
| 2007/0121615 | A1 | 5/2007 | Weill et al. |
| 2007/0153798 | A1 | 7/2007 | Krstulich |
| 2007/0156919 | A1 | 7/2007 | Potti et al. |
| 2008/0034127 | A1* | 2/2008 | Nishio ............ 710/11 |
| 2008/0253366 | A1 | 10/2008 | Zuk et al. |
| 2008/0270618 | A1 | 10/2008 | Rosenberg |
| 2008/0320582 | A1 | 12/2008 | Chen et al. |
| 2009/0063852 | A1 | 3/2009 | Messerges et al. |
| 2009/0077618 | A1 | 3/2009 | Pearce et al. |
| 2009/0106433 | A1 | 4/2009 | Knouse et al. |
| 2009/0252148 | A1 | 10/2009 | Dolganow et al. |
| 2010/0251343 | A1 | 9/2010 | Barrett |

OTHER PUBLICATIONS

"Control Plane," Wikipedia—the free encyclopedia, 4 pages, http://en.wikipedia.org/w/index.php?title=Control_plane&printable=yes (accessed Jul. 31, 2008).
"editcap—Edit and/or translate the format of capture files," ethereal.com, 3 pages, www.ethereal.com/docs/man-pages/editcap.1.html (accessed Apr. 15, 2004).
"ethereal—Interactively browse network traffic," ethereal.com, 29 pages, www.ethereal.com/docs/man-pages/ethereal.1.html (accessed Apr. 15, 2004).
"FAQ: Network Intrusion Detection Systems," robertgraham.com, Mar. 21, 2000, www.robertgraham.com/pubs/network-intrusion-detection.htm (accessed Apr. 15, 2004).
"Forwarding Plane," Wikipedia—the free encyclopedia, 5 pages, http://en.wikipedia.org/w/index.php?title=Forwarding_plane&printa . . . (accessed Jul. 31, 2008).
"Network Management," Wikipedia—the free encyclopedia, 3 pages, http://en.wikipedia.org/w/index.php?title=Network_management< . . . (accessed Jul. 31, 2008).
"Network Sniffer," linuxmigration.com, 4 pages, www.linuxmigration.com/quickref/admin/ethereal.html (accessed Apr. 15, 2004).
"Telecommunications Network," Wikipedia—the free encyclopedia, 2 pages, http://en.wikipedia.org/w/index.php?title=Telecommunications_net . . . (accessed Jul. 31, 2008).
"tethereal—Dump and analyze network traffic," ethereal.com, 11 pages, www.ethereal.com/docs/man-pages/tethereal.1.html (accessed Apr. 15, 2004).
Berners-Lee, T. et al., "Uniform Resource Identifiers (URI) : Generic Syntax," IETF RFC 2396, Aug. 1998.
Hinden, R. et al., "Format for Literal IPv6 Addresses in URL's," IETF RFC 2732, Dec. 1999.
Valloppillil, Vinod et al., "Cache Array Routing Protocol v1.0," Feb. 1998, 7 pages, http://icp.ircache.net/carp.txt (accessed Jul. 25, 2008).
About Computing & Technology, "Wireless/Networking, Nagle algorithm," visited Dec. 6, 2005. 2 pages, <http://compnetworking.about.com/od/tcpip/l/bldef_nagle.htm>.

Acharya et al., "Scalabe Web Request Routing with MPLS," IBM Research Report, IBM Research Division, Dec. 5, 2001, 15 pages.
Australia's Academic and Research Network, "Programs and large MTU, Nagle algorithm," visited Dec. 9, 2005, 3 pages, <http://www.aarnet.edu.au/engineering/networkdesign/mtu/programming.html>.
Berners-Lee, T. et al., RFC 1945, "Hypertext Transfer Protocol—HTTP/1.0," May 1996, 60 pages.
"Big-IPs Controller with Exclusive OneConneds Content Switching Feature Provides a Breakthrough System for Maximizing Server and Network Performance," F5 Networks, Inc., Press Release, May 8, 2001, accessed Jun. 4, 2002, 3 pages.
Bryhni et al., "A Comparison of Load Balancing Techniques for Scalable Web Servers," IEEE Network, Jul./Aug. 2000, pp. 58-64.
F5 Networks Delivers Blistering Application Traffic Management Performance and Unmatched Intelligence via New 7 Packet Velocity ASIC and BI-IP Platforms, F5 Networks, Inc. Press Release dated Oct. 21, 2002, 3 pages.
Fielding, R. et al., "Hypertext Transfer Protocol—HTTP/1.1," Network Working Group, RFC 2068, Jan. 1997, 152 pages.
Fielding, R. et al., "Hypertext Transfer Protocol—HTTP/1.1," W3 Consortium, Jun. 1999, pp. 1-176, http://www.w3.org/Protocols/rfc2616/rfc2616.html.
Fielding, R. et al., RFC 2616, "Hypertext Transfer Protocol—HTTP/1.1," Jun. 1999, 114 pages.
fifi.org, "Manpage of TCP," visited Dec. 9, 2005, 6 pages, <http://www.fifi.org/cgi-bin/man2html/usr/share/man/man7/tcp.7.gz>.
Freier, A. et al., Netscape Communications Corporation, "The SSL Protocol, Version 3.0," Mar. 1996, 60 pages.
Hochmuth, P. "F5 CacheFlow Pump Up Content-Delivery Lines," NetworkWorld, May 4, 2001, http://www.network.com/news/2001/0507cachingonline.html, accessed Jun. 1, 2005, 3 pages.
IP Multimedia Subsystems, http://en.wikipedia.org/w/index.php?title=IP_Multimedia_Subsyst . . . , accessed May 15, 2008, 8 pages.
Jacobson, V. et al., "TCP Extensions for High Performance," May 1992, http://www.faqs.com/rfcs/rfc1323.html.
Kessler, G. et al., RFC 1739, "A Primer on Internet and TCP/IP Tools," Dec. 1994, 46 pages.
Mapp, G., "Transport Protocols—What's Wrong with TCP," Jan. 28, 2004, LCE Lecture at http://www.ice.eng.cam.ac.uk/~gem11,4F5-Lecture4.pdf, pp. 1-60.
Nagle, J., RFC 896, "Congestion control in IP/TCP internetworks," Jan. 6, 1984, 13 pages.
Nielsen, H. F. et al., "Network Performance Effects of HTTP/1.1, CSS1, and PNG," Jun. 24, 1997, W3 Consortium, http://www.w3.org/TR/NOTE-pipelining-970624$Id:pipeline.html, v 1.48 100/10/18 19:38:45 root Exp $, pp. 1-19.
OpenSSL, visited Apr. 12, 2006, 1 pg., <www.openssl.org>.
Oracle Communication and Mobility Server, Aug. 2007, http://www.oracle.com/technology/products/ocms/otn_front.html, accessed May 15, 2008, 108 pages.
Paxson, V., RFC 2525, "Known TCP Implementation Problems," Mar. 1999, 61 pages.
Postel, J., "Transmission Control Protocol," Sep. 1981, Information Sciences Institute, University of Southern California, Marina del Rey, California, http://www.faqs.org/rfcs/rfc793.html, pp. 1-21.
Rescorla, E. "SSL and TLS, Designing and Building Secure Systems", 2001, Addison-Wesley, 46 pages.
RSA Laboratories, "PKCS #1 v2.0: RSA Cryptography Standard," Oct. 1, 1998, 35 pages.
Schroeder et al., "Scalable Web ServerClustering Technologies," IEEE Network May/Jun. 2000, pp. 38-45.
SearchNetworking.com, "Nagle's algorithm," visited Dec. 6, 2006, 3 pages, <http://searchnetworking.techtarget.com/sDefinition/0,,sid7_0754347,00.html>.
Secure and Optimize Oracle 11i E-Business Suite with F5 Solutions, F5 Application Ready Network Guide, Oracle E-Business Suite 11i, Aug. 2007, 2 pages.
Session Initiation Protocol, http://en.wikipedia.org/w/index.php?title=Session_Initiation_Protoc . . . , accessed May 14, 2008, 5 pages.
Stevens, W. R., "TCP/IP Illustrated," vol. 1: The Protocols, Addison-Wesley Professional, Dec. 31, 1993, pp. 1-17.

(56) References Cited

OTHER PUBLICATIONS

Stevens, W. "TCP Slow Start, Congestion Avoidance, Fast Retransmit, and Fast Recovery Algorithms," Jan. 1997, Sunsite.dk, http://rfc.sunsite.dk/rfc/rfc2001.html, pp. 1-6.

Tormasov, A. et al., "TCP/IP options for high-performance data transmission," visited Dec. 9, 2005, 4 pages, <http://builder.com.com/5100-6732-1050878.html>.

Using the Universal Inspection Engine, Manual Chapter: BIG-IP Solutions Guide v4.6.2: Using the Universal Inspection Engine, 2002, 8 pages.

W3C, "HTTP/1.1 and Nagle's Algorithm," visited Dec. 6, 2006, 3 pages http://www.w3.org/Protocols/HTTP/Performance/Nagle/.

Dierks, T. et al., "The TLS Protocol Version 1.0," RFC 246, 32 pages, Jan. 1999.

Housley, R. et al., "Internet X.509 Public Key Infrastructure Certificate and CRL Profile." RFC 2459, 121 pages, Jan. 1999.

Enger, R. et al., "FYI on a Network management Tool Catalog: Tools for Monitoring and Debugging TCP/IP Internets and Interconnected Devices," RFC 1470, 52 pages, Jun. 1993.

Reardon, M., "A Smarter Session Switch: Arrowpoint's CS Session Switches Boast the Brains Needed for E-Commerce," Data Communications, Jan. 1999, title page, pp. 3, 5, 18.

Hewitt, J. R. et al., "Securitied Practice and Electronic Technology," Corporate Securities Series, New York: Law Journal Seminars-Press, 1998, title page, bibliographic page, pp. 4.29-4.30.

Official Communication for U.S. Appl. No. 11/258,551 mailed Mar. 3, 2009.

Official Communication for U.S. Appl. No. 11/258,551 mailed Jan. 4, 2010.

Official Communication for U.S. Appl. No. 11/258,551 mailed Aug. 3, 2010.

Official Communication for U.S. Appl. No. 11/258,551 mailed Mar. 31, 2011.

Official Communication for U.S. Appl. No. 12/475,307 mailed Feb. 10, 2011.

Official Communication for U.S. Appl. No. 12/475,307 mailed Jul. 22, 2011.

Official Communication for U.S. Appl. No. 12/475,307 mailed Sep. 29, 2011.

Freier, A. et al., "The SSL Protocol Version 3.0," IETF, Internet Draft, 62 pages, Nov. 18, 1996.

Official Communication for U.S. Appl. No. 11/258,551 mailed Aug. 15, 2012.

Official Communication for U.S. Appl. No. 11/258,551 mailed Dec. 6, 2012.

Official Communication for U.S. Appl. No. 13/174,237 mailed Mar. 21, 2014.

Office Communication for U.S. Appl. No. 10/172,411 mailed on Sep. 1, 2006.

Office Communication for U.S. Appl. No. 10/172,411 mailed on Jun. 19, 2006.

Office Communication for U.S. Appl. No. 10/172,411 mailed on Oct. 18, 2007.

Office Communication for U.S. Appl. No. 10/172,411 mailed on Apr. 25, 2008.

Office Communication for U.S. Appl. No. 10/172,411 mailed on Oct. 1, 2008.

Office Communication for U.S. Appl. No. 10/172,411 mailed on Dec. 16, 2005.

Office Communication for U.S. Appl. No. 10/172,411 mailed on Apr. 30, 2007.

Office Communication for U.S. Appl. No. 10/172,411 mailed on Nov. 13, 2006.

Office Communication for U.S. Appl. No. 10/409,951 mailed on Jul. 17, 2008.

Office Communication for U.S. Appl. No. 10/409,951 mailed on Nov. 30, 2006.

Office Communication for U.S. Appl. No. 10/409,951 mailed on Mar. 8, 2007.

Office Communication for U.S. Appl. No. 10/409,951 mailed on Jan. 4, 2008.

Office Communication for U.S. Appl. No. 10/409,951 mailed on Aug. 24, 2007.

Office Communication for U.S. Appl. No. 10/409,951 mailed on Jun. 16, 2006.

Office Communication for U.S. Appl. No. 10/719,375 mailed on Jun. 18, 2008.

Office Communication for U.S. Appl. No. 10/719,375 mailed on Apr. 24, 2009.

Office Communication for U.S. Appl. No. 10/719,375 mailed on Nov. 13, 2009.

Office Communication for U.S. Appl. No. 11/243,844 mailed on Oct. 18, 2008.

Office Communication for U.S. Appl. No. 11/243,844 mailed on Feb. 20, 2009.

Office Communication for U.S. Appl. No. 11/243,844 mailed on Jul. 16, 2009.

Office Communication for U.S. Appl. No. 11/243,844 mailed on Feb. 19, 2010.

Office Communication for U.S. Appl. No. 11/139,061 mailed on Feb. 5, 2009.

Office Communication for U.S. Appl. No. 11/139,061 mailed on Sep. 22, 2009.

Office Communication for U.S. Appl. No. 11/366,367 mailed on Feb. 11, 2009.

Office Communication for U.S. Appl. No. 11/366,367 mailed on Aug. 22, 2008.

Office Communication for U.S. Appl. No. 13/174,237 mailed on Sep. 25, 2014.

Office Communication for U.S. Appl. No. 13/174,237 mailed on Dec. 8, 2014.

Official Communication for U.S. Appl. No. 12/475,307 mailed on Jan. 26, 2015.

Official Communication for U.S. Appl. No. 13/174,237 mailed on Apr. 6, 2015.

\* cited by examiner

EXPOSED CONTROL COMPONENTS FOR CUSTOMIZABLE LOAD BALANCING AND PERSISTENCE

TECHNICAL FIELD

The present invention relates generally to network communications, and more particularly, but not exclusively, to exposing access to network metrics to a late binding user customized set of computer instructions within a traffic manager device (TMD) for use in managing a request for a resource.

BACKGROUND

The Internet's bandwidth continues to double every year. Some of this additional bandwidth is consumed, however, as new users access the Internet. Still additional bandwidth is consumed as existing users increase their use of the Internet. This increase of Internet use translates into an increase in traffic directed to and from various servers and through various networking components.

While some networking components are less costly they may still generally require a distribution mechanism to spread the workload so that each networking component performs work proportional to its capacity. Without proper placement and/or application of a networking component, eventually a network infrastructure may not be able to process its traffic in a timely manner.

In high availability networking environments, one or more servers, caches, and/or other network components may be backed-up via a fail-over system, such that if the primary component fails, a backup component may replace it. Such fail-over implementations, wherein one component is replaced by another component may, however, complicate many traditional load balancing mechanisms.

Load-balancing of cache servers and/or proxy servers may have unique load-balancing requirements over other types of services. For example, it may not be realistic to attempt to cache an entire network site, application, or the like, on a single cache device. A typical solution therefore, is to load balance requests for content and to persist subsequent requests to a specific cache device based on the content being requested. In a forward proxy example, all requests for one site might then be configured to be sent to a first cache device, while requests for a second site might be configured to be sent to a second cache device. Since each cache device would get all the requests fro their respective sties, they will typically have the most up to date version of the content cached. One problem however often arises when a cache device is removed or new cache devices are added, such as during fail-over situations, or the like. In traditional situations, the new cache devices may not receive requests. For example, if all content is already persisted to an existing cache device, the newly added cache device might remain unused until the content changes or a content's persistence timer expires, resulting in wasted resources. Moreover, when an existing cache device is removed from a pool of cache devices, reassigning requests to another cache device may take considerable time to repopulate the other cache device with new content.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
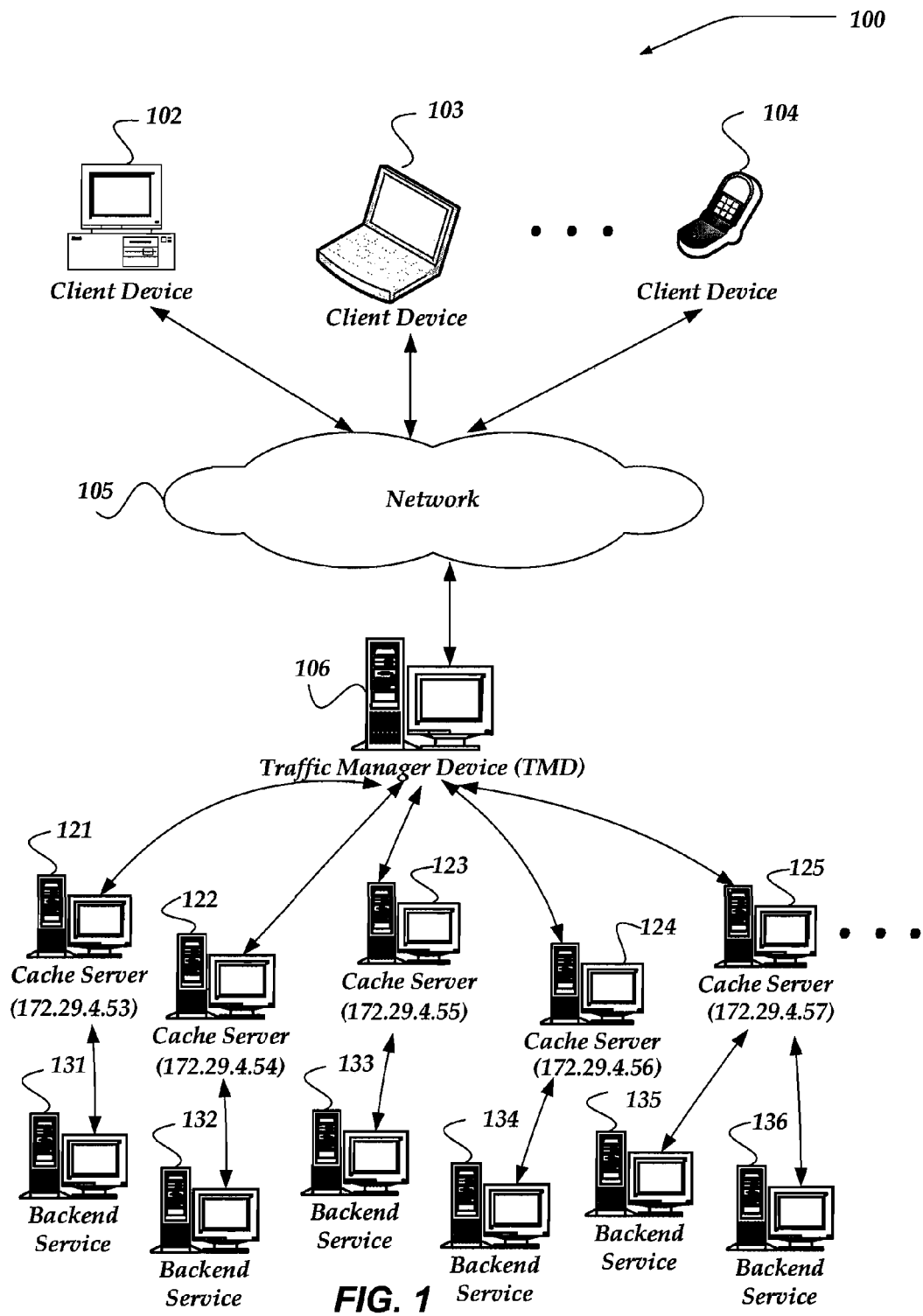
FIG. 1 shows a block diagram illustrating one example of an environment useable for implementing embodiments of the invention.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

As used herein, the term "Uniform Resource Identifier," or "URI" refers to any string of characters used to identify a name of a resource on a network. As such, a URI may be a Uniform Resource Locators (URLs), and Uniform Resource Names (URN), or both. URIs are described in more detail in Request For Comments (RFC) 2396 (updated by RFC 2732) entitled "Uniform Resource Identifiers (URI): Generic Syntax," which is available through the Internet Engineering Task Force (IETF), and is further incorporated herein by reference.

As used herein, the term 'binding' refers to assigning a value to a symbolic placeholder in computer programming. Thus, for example, binding during compilation refers to the act of replacing symbolic addresses for a variable and/or instruction with a machine address. Early binding refers to such assignments that occur at any time during compilation, linking, packaging, and/or installing of computer-readable code onto a target. Late binding refers to such assignments that occur at any time after early binding, including, when execution of the computer-readable code starts, after execution of the computer-readable code, or when such computer-readable code executes interpreted instructions.

Today, telecommunications networks, which include any network of links and nodes arranged to allow messages to be passed from one part of the network to another over multiple links and through various nodes, are conceptually described to have a structure consisting of three planes (or aspects): a control plane, a data plane, and a management plane. As used herein, the term "control plane" refers to those parts of a telecommunications network that are configured to carry control (sometimes called "signaling") information. As such, the control plane may be concerned with drawing of a network map, monitoring the network, and/or other information and activities that defines what to do with incoming messages. For example, control plane activities associated with monitoring the network include, but are not limited to performing health monitoring (such as at layers 4-7 of the Open Systems Interconnection (OSI) protocol stack), providing various routing activities such as Open Shortest Path First (OSPF) at a layer 3 of the OSI protocol stack, and performing Link Aggregation Control Protocol (LACP) activities, such as at layer 2 of the OSI protocol stack.

As used herein, the term "management plane" refers to those parts of a telecommunications network that carries operations and administration, maintenance, and provisioning traffic. Operations refer to those activities toward keeping the network and services the network provides up and running. Administration refers to actions directed towards keeping track of resources in the network and how they are assigned. Maintenance refers to actions directed towards performing repairs and/or upgrades to the network, while provisioning refers to actions directed towards configuring resources in the network to support a given service.

As used here, the term "data plane" refers to those parts of a telecommunications network that are directed toward carrying user traffic. The data plane therefore defines actions directed towards deciding what to do with packets arriving on an inbound interface.

Thus, for example, a router maybe segmented into three planes of operation, each with a clearly identified objective. The data plane allows the ability to forward data packets; the control plane allows the ability to route data correctly; and the management plane allows the ability to manage network elements.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards enabling a user to employ a scripting language to generate user customized instructions for use in selecting one or more network devices from a plurality of network devices to perform an action. Such user customized instructions are provided during a late binding with a traffic manager that exposes for access various control plane and/or management plane metrics.

By performing such late binding with the traffic manager the user, such as a system administrator, is provided an ability to perform a variety of actions, including, but not limited to selecting a network device to which a request is sent; selecting a set of network devices, from a plurality of network devices for which a request is sent; dropping the request, for example, when the metrics indicate that no network device is currently available to service the request; delay the request pending availability of a network device; and/or modify the request and perform one or more of the actions noted above. Late binding user customized instructions are not limited to these non-exhaustive non-limiting examples, and others may also be performed.

For ease of understanding, a non-limiting example of a possible late binding user algorithm is described below for managing persistence to a network device for client requests using an election hash mechanism. In one embodiment, a traffic manager device (TMD) is interposed between client devices and a plurality of network devices. The plurality of network devices may be distributed among a plurality of different resource pools. However, the plurality of network devices need not be distributed across resource pools, and other configurations and arrangements may also be employed.

In one embodiment, the network devices may operate as cache servers, where content may be obtained from, for example, backend servers by the cache servers. In another embodiment, the plurality of network devices may be configured to operate as intrusion detection devices, application servers, or even operate as backend servers.

When a request from a client device for a resource is intercepted by the TMD, a user's late binding algorithm may be provided with various metrics useable to determine which network device to forward the request so as to manage persistence in resource requests, and to further load balance the requests. Such determination may be performed by selecting from the plurality of resource pools (where such resource pools are employed) which resource pool of network devices to provide the request. In one embodiment, the determination is performed by extracting request specific data from the request and using the extracted data to select a resource pool. Metrics about the resource pool may be made accessible to the user's late binding algorithm, and include various control plane and/or management plane metrics.

In one embodiment, the selection may be based on a result of a modulo calculation on a hash of the request specific data. Such request specific data may include, but is not limited to a Uniform Resource Identifier (URI), host name, cookie identifier, client identifier, path name, or the like.

A network device in the plurality of network devices, associated with the selected resource pool, may be elected based on an election hash. In one embodiment, the election hash may be determined by generating a plurality of hash values based on combining the request specific data with an identifier for each respective network devices that is indicated as being available. In one embodiment, the resulting hashes may be examined and the network device associated with a highest (or lowest) resulting hash may be elected. It should be noted that other schemes may also be employed for selecting a network device. For example, late binding user customized instructions may be employed to select a network device randomly, without departing from the scope of the invention. The request may then be sent to the elected network device.

In one embodiment, the network devices may operate as an intrusion detection system (IDS), which may be configured to monitor network traffic to detect actions directed towards compromising a confidentiality, integrity, and/or availability of a network resource. It may be desirable in such applications to mirror traffic from a client device and/or responding server to the IDS. Thus, in one embodiment, the invention may be implemented to load-balance and persist similar traffic requests, responses, and/or the like to one of the plurality of network devices in the intrusion detection system. It should be clear, however, that the invention is not limited to this non-exhaustive environment, and others are also envisaged without departing from the scope of the invention. Moreover, it should be noted that the invention is not limited to the above non-limiting late binding actions, and others are also possible.

Illustrative Operating Environments

FIG. 1 shows a block diagram illustrating one example of an environment for practicing the invention. System 100 of FIG. 1 may include more or less components that are illustrated. However, the components shown are sufficient to disclose an illustrative environment.

As shown in the figure, system 100 includes client devices 102-104, network 105, traffic manager device (TMD) 106, cache servers 121-125, and backend services 131-136. Client devices 102-104 communicate with TMD 106 through network 105. TMD 106 is in communication with cache servers 121-125, which, in turn are in communication with backend services 131-136. Although not illustrated a network, substantially similar, albeit different, may be interposed between TMD 106 and cache servers 121-125 and/or backend services 131-136. Although not illustrated, TMD 106 may also be in communication with backend services 131-136.

Generally, client devices 102-104 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client devices 102-104 may also include other computing devices typically considered to be non-portable devices, including, but not limited to personal computers, multiprocessor systems, microprocessor-based or programmable consumer electronics, network devices, and the like. As such, client devices 102-104 may range widely in terms of capabilities and features. For example, a client device configured as a cell phone may have a numeric keypad and a few lines of monochrome LCD display on which only text may be displayed.

Client devices 102-104 also may include at least one client application that is configured to send a request for content or other resource and to receive the requested content or other resource from another computing device, such as from TMD 106, cache servers 121-125, and/or backend services 131-136. The client application may include a capability to provide and receive textual content, graphical content, audio content, alerts, messages, and the like. Moreover, client devices 102-104 may be further configured to communicate a message, such as through a Short Message Service (SMS), Multimedia Message Service (MMS), instant messaging (IM), internet relay chat (IRC), mIRC, Jabber, and the like, between another computing device, and the like.

Moreover, in one embodiment, the request for content or other resource may include request specific data. Such request specific data may, in one embodiment, be classified as data from the data plane part of a telecommunications network. In one embodiment, the request specific data may include information that uniquely identifies the requesting client device through any of a variety of mechanisms, including a phone number, Mobile Identification Number (MIN), an electronic serial number (ESN), a source network address, a port number, or other client device identifier. Request specific data may also include, but is not limited to application layer data (OSI layer 5 and/or above), including communication protocol information, such as whether the request is an HTTP request, or the like; cookie information; and the like. Request specific data might include information such as a URI being requested, a path name to the requested resource, or any of a variety of other data plane information.

In another example of client devices, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Network 105 is configured to couple one computing device with another computing device. Network 105 may be enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 105 may also include an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, Universal Mobile Telecommunications System (UMTS), and the like. In essence, network 105 may include virtually any wired and/or wireless communication mechanisms by which information may travel between one computing device and another computing device, network, and the like.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment, of TMD 106 is described in more detail below in conjunction with FIG. 4. Briefly, however, TMD 106 may include virtually any device that manages network traffic. Such devices include, for example, routers, proxies, firewalls, load balancers, cache devices, devices that perform network address translation, any combination of the preceding devices, and the like. TMD 106 may, for example, control the flow of data packets delivered to and forwarded from a plurality of network devices, such as cache servers 121-125, and/or backend services 131-136. TMD 106 may receive data packets from and transmit data packets to the Internet, an intranet, or a local area network accessible through another network. TMD 106 may recognize packets that are part of the same communication, flow, and/or stream and may perform special processing on such packets, such as directing them to the same network device so that state information is maintained. TMD 106 also may support a wide variety of network applications such as web browsing, email, telephony, streaming multimedia and other traffic that is sent in packets. The BIG-IP® family of traffic managers, by F5 Networks Inc. of Seattle, Wash., are one example of TMDs. Moreover, TMDs are described in more detail in U.S. Pat. No. 7,102,996 to Amdahl, et al. entitled "Method and System for Scaling Network Traffic Managers," which is incorporated herein by reference.

In one embodiment, TMD 106 includes a traffic manager application that is configured to manage network traffic. Such application (described in more detail below) may enable a recipient end-user, such as an administrator, or the like, to install the application onto TMD 106, and/or to include a late binding user customized set of computer instructions for. The late binding instructions enable the administrator, or the like, to implement user-customized instructions for managing network traffic using network metrics that the traffic manager may expose.

In one embodiment, the late binding set of computer instructions may be implemented using various scripting languages. For example, in one embodiment, the instructions may be implemented using a rules based scripting mechanism such as provided by F5 Networks, Inc. of Seattle, Wash. Non-exhaustive, non-limiting examples using such rules operating on network metrics are described in more detail in U.S. patent application Ser. No. 11/258,551 entitled "Rule Based Extensible Authentication" to Hughes, et al., filed Oct. 24, 2005; U.S. patent application Ser. No. 10/385,790 entitled "Method And System For Managing Network Traffic," to Richard Roderick Masters et al., filed Mar. 10, 2003; and in U.S. patent application Ser. No. 10/719,375 entitled "System And Method For Directing Network Traffic In Tunneling Applications," to Bradfield et al., filed Nov. 21, 2003, each of which are incorporated herein by reference.

TMD 106 may receive a request from one of client devices 102-104 that is to be directed to one of backend services 131-136. TMD 106 may inspect the request to extract any request specific data. In one embodiment, TMD 106 might use an inspection engine component to perform deep packet inspection of data at an Open Systems Interconnection (OSI) layer 5 and/or above to detect the request specific data. In one embodiment, the inspection engine component may employ an Application Programming Interface (API), or the like, to enable selection and extraction of various request specific data. However, request specific data is not constrained to layers 5 or above, and other layers may also be inspected to obtain additional request specific data.

TMD 106 may then enable, in one embodiment, the traffic manager to manage the traffic. Alternatively, TMD 106 may enable the user-customized late binding instructions to manipulate traffic flowing through TMD 106. For example, in one embodiment, the user-customized late binding instructions might be employed to perform an election hash mechanism as described further below, to select a cache server to forward the request. By employing the election hash mechanism, TMD 106 may manage persistence of communications with a selected cache server, while managing load-balancing of requests across a plurality of cache servers. In one embodiment, the request specific data is related to requested content. By employing content request data to manage load-balancing and persistence, rather than a connection per se, TMD 106 may improve a use of cache servers. This is because cache servers typically are configured to manage temporary storage of content independent of which client device might request the content. Thus, by persisting requests based on content, the election hash mechanism may improve management of cache servers over, for example, approaches based on connections, or the like. In any event, TMD 106 may employ a process such as described below in conjunction with FIGS. 5-6 to perform one embodiment of an election hash mechanism.

Devices that may operate as TMD 106 include but are not limited to personal computers, desktop computers, multiprocessor systems, microprocessor-based or programmable consumer electronics, network PCs, servers, or the like.

Cache servers 121-125 include virtually any network device that may be configured to retrieve content from another computing device, such as backend services 131-136, for use in responding to a request from client devices 102-104. Cache servers 121-125 may employ any of a variety of mechanisms to retrieve and temporarily store the content for rapid access. Cache servers 121-125 might receive a request for content through TMD 106. The cache server receiving the request may examine its storage to determine if the requested content is locatable within the cache server, and/or whether the located content is considered to be valid and/or 'fresh.' If the cache server is unable to locate valid and/or 'fresh' content being requested, the cache server may employ any of a variety of mechanisms to request the content from one of backend services 131-136. The cache server responding to the request may, in one embodiment, purge invalid content, stale content, and/or the like, and replace such requested content with valid, fresh content.

In one embodiment, cache servers 121-125 may be configured to communicate with one or more different backend services 131-136. In one embodiment, however, cache servers 121-125 might be configured to be dedicated to one or more backend services, such that each cache sever does not access each backend service 131-136. However, due to a variety of reasons, one or more of cache servers 121-125 may be replaced, added, deleted, or the like.

Each cache server may be identified by a network identifier. As shown, in a non-exhaustive example, cache servers may be identified by a network address, such as 172.29.4.53, or the like. However, the invention is not limited to this type of network identifiers, and others may also be employed to identify a cache server, including, but not limited to an IP address/port number combination; a URI, an alias, or the like.

Devices that may operate as cache servers 121-125 include but are not limited to personal computers, desktop computers, multiprocessor systems, microprocessor-based or programmable consumer electronics, network PCs, servers, or the like.

Backend services 131-136 may include any computing device capable of communicating packets over a network in response to a request. Each packet may convey a piece of information. A packet may be sent for handshaking, i.e., to establish a connection or to acknowledge receipt of data. The packet may include information such as a request, a response, or the like. Generally, packets received by backend services 131-136 will be formatted according to TCP/IP, but they could also be formatted using another transport protocol, such as SCTP, X.25, NetBEUI, IPX/SPX, token ring, similar IPv4/6 protocols, and the like. Moreover, the packets may be communicated between backend services 131-136 and cache servers 121-125, and/or TMD 106, and/or client devices 102-104 employing HTTP, HTTPS, and the like.

In one embodiment, backend services 131-136 are configured to operate as website servers. However, backend services 131-136 are not limited to web servers, and may also operate a messaging server, a File Transfer Protocol (FTP) server, a database server, content server, and the like. Additionally, each of backend services 131-136 may be configured to perform a different operation. Thus, for example, back-end service 131 may be configured as a messaging server, while back-end service 132 is configured as a database server. Moreover, while backend services 131-136 may operate as other than websites, they may still be enabled to receive an HTTP communication.

Devices that may operate as backend services 131-136 include personal computers, desktop computers, multiprocessor systems, microprocessor-based or programmable consumer electronics, network PCs, servers, and the like.

Figure 2:
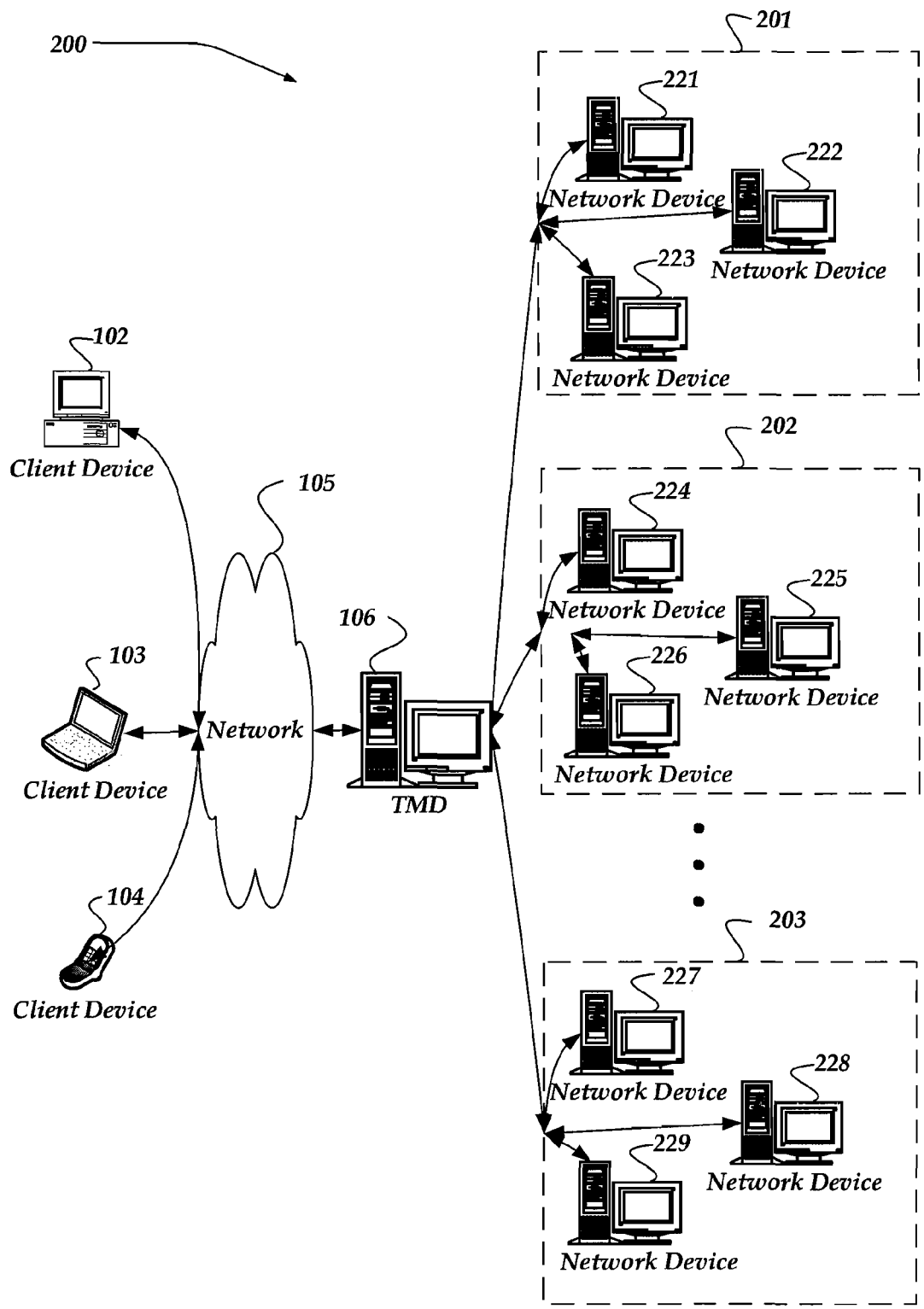
FIG. 2 shows a block diagram illustrating another example of an environment with resource pools useable for implementing embodiments of the invention.

FIG. 2 shows a block diagram illustrating another example of an environment for practicing the invention. In particular, system 200 of FIG. 2 provides another non-exhaustive example of late binding user-customized instructions for use in managing traffic flow through the TMD. As shown, system 200 of FIG. 2 illustrates a plurality of network devices distributed among a plurality of resource pools. System 200 of FIG. 2 may include more or less components that are illustrated. However, the components illustrated are sufficient to disclose an illustrative embodiment for practicing one or more embodiments of the invention.

As shown in the figure, system 200 includes client devices 102-104, network 105, traffic manager device (TMD) 106, and resource pools 201-203. Resource pool 201 includes network devices 221-223; resource pool 202 includes network devices 224-226; and resource pool 203 includes network devices 227-229.

Client devices 102-104, network 105, and TMD 106 operate substantially the same as client devices 102-104, network 105, and TMD 106, respectively, of FIG. 1. In one embodiment, network devices 221-229 may be configured to operate as cache servers substantially similar to cache servers 121-125 of FIG. 1. However, the invention is not so limited, and network devices 221-229 may also be configured to operate as backend services, such as backend services 131-136, as application servers, or any of a variety of other computing devices configured to provide a response to a client request. As such, network devices 221-229 may be implemented using, without limit, personal computers, desktop computers, multiprocessor systems, microprocessor-based or programmable consumer electronics, network PCs, servers, and the like.

As shown, resource pools 201-203 may provide one or a variety of mechanisms for managing a plurality of network devices. Resource pools may include a different number, or a same number of network devices, as well as a different or a same type of network device. For example, in one embodiment, network devices may be distributed among the resource pools based on varying disk and/or processor capacity. For instance resource pool 201 might include network devices configured with larger disk capacity and/or faster processors than network devices in resource pool 202, or the like. Clearly, the invention is not limited by this non-exhaustive example, and other distribution schemes may also be employed. Including, but not limited, for example, to distributing network devices randomly among resource pools 201-203. In any event, in one embodiment, resource pools may be identified over a network using any of a variety of mechanisms, including, but not limited to a port number, a unique pool identifier, or the like.

Figure 3:
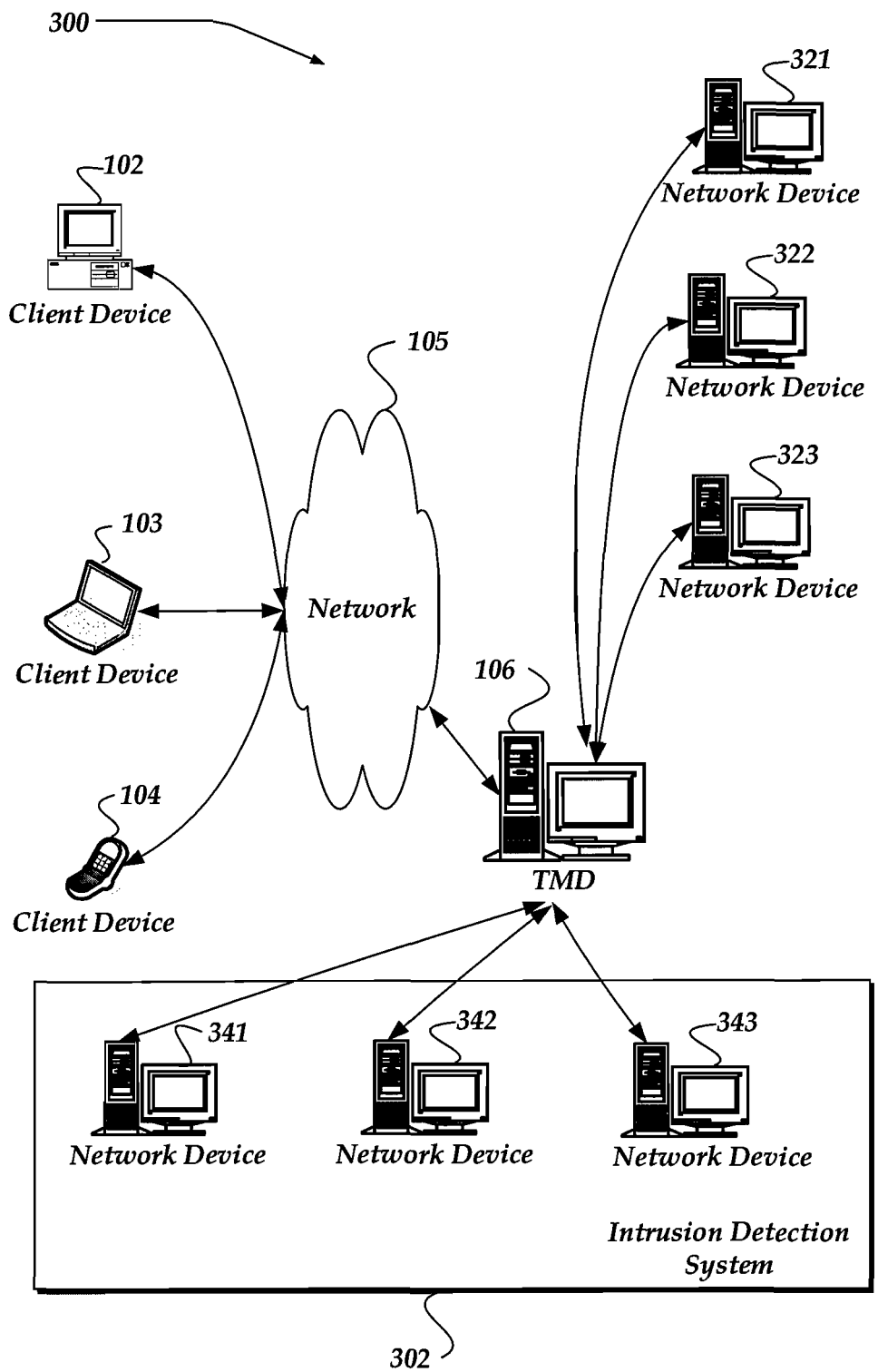
FIG. 3 shows a block diagram illustrating yet another example of an environment for using the invention, wherein an intrusion detection system is employed.

FIG. 3 shows a block diagram illustrating another example of an environment for practicing the invention. System 300 of FIG. 3 provides yet another non-exhaustive, non-limiting example of employing a late binding user customized set of computer instructions within the TMD for use in managing a request for a resource.

System 300 of FIG. 3 may include more or less components that are illustrated. System 300 of FIG. 3 illustrates a plurality of network devices 321-323 and an intrusion detection system 302 that includes a plurality of network devices 341-343. System 300 further includes client devices 102-104, network 105, and TMD 106, which operate substantially the same as client devices 102-104, network 105, and TMD 106, respectively, of FIG. 1.

IDS 302 may be configured with network devices 341-343 that monitor network traffic through TMD 106 for possible security violations, including, but not limited to potential and/or actual compromises to confidentiality, integrity, and/or availability of a network resource, such as network devices 321-323, TMD 106, or the like. As such, there may be a desire to load-balance and persist communications among the network devices within intrusion detection system (IDS) 302, while also load-balancing and persisting requests among network devices 321-323. In one embodiment, it may be desirable to persist communications to a same network device within IDS 302 based on a content requested, as well as a client device making the request, a traffic type, or the like. Such monitoring of network activities by network devices 341-343 might be performed using a mirroring of network traffic through TMD 106. However, the invention is not so limited. For example, in another embodiment, TMD 106 might divert each communication from client device 102-104 and/or network devices 321-323 to IDS 302 before forwarding the communications to a destination. In any event, TMD 106 may employ an election hash mechanism as described herein to direct requests, and/or other communications to IDS 302 based on request specific data. TMD 106 may also route requests to one or network devices 321-323 using request specific data.

In one embodiment, the request specific data used to route requests to IDS 302 versus to network devices 321-323 may be different. In another embodiment, the request specific data may be the same. Request specific data may include, but is not limited to, content request data that may be obtained by a packet inspection at/or above layer 5 of the OSI layered stack. For example, the request specific data might include but is not limited to URI data, cookie information, a path name, an application name, a request protocol type, or the like. In another embodiment, the request specific data might also include information about a client device, such as a client identifier, source address, port number, or the like. In any event, TMD 106 of FIG. 3 may employ a process substantially similar to process 500 described below in conjunction with FIG. 5.

In one embodiment, network devices 321-323 may operate as cache servers, backend services, or the like. In one embodiment, although not illustrated, network devices 321-323 may be in communication with one or more other network devices, such as the arrangement illustrated in FIG. 1.

Illustrative Network Device

Figure 4:
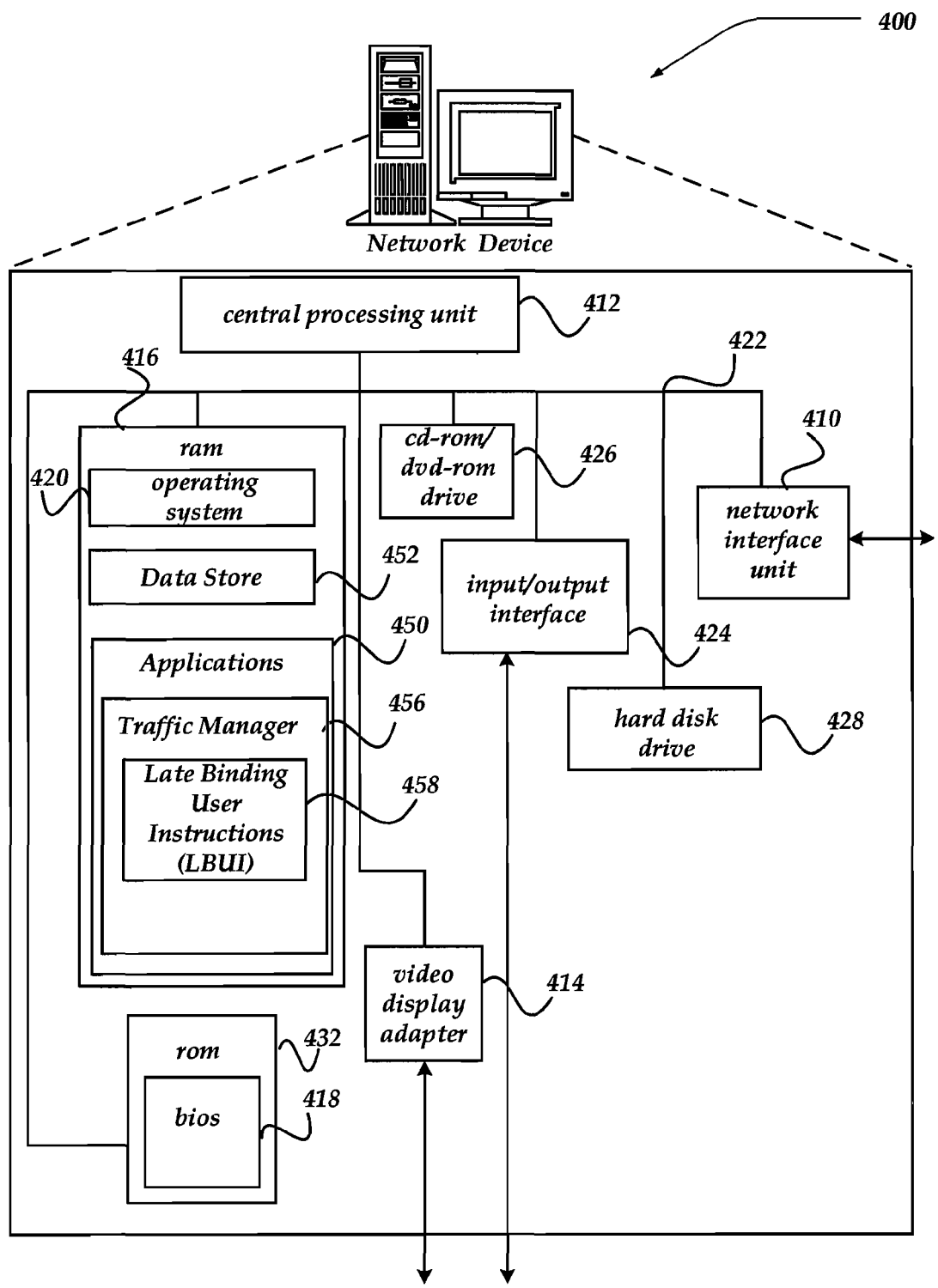
FIG. 4 illustrates one embodiment of a network device for managing persistence based on election hashes of network device identifiers with request specific data.

FIG. 4 shows one embodiment of a network device, according to one embodiment of the invention. Network device 400 may include many more or less components than those shown. The components shown, however, are sufficient to disclose an illustrative embodiment for practicing one or more embodiments of the invention. Network device 300 may represent, for example, TMD 106 of FIGS. 1-3.

Network device 400 includes at least one central processing unit (CPU) 412, video display adapter 414, and a mass memory, all in communication with each other via bus 422. The mass memory generally includes RAM 416, ROM 232, and one or more permanent mass storage devices, such as hard disk drive 428, tape drive, optical drive, and/or floppy disk drive. The mass memory stores operating system 420 for controlling the operation of network device 400.

As illustrated in FIG. 4, network device 400 also can communicate with the Internet, or some other communications network via network interface unit 410, which is constructed for use with various communication protocols including the IP protocol. Network interface unit 410 is sometimes known as a transceiver, transceiving device, or network interface card (NIC).

The mass memory 416, 426, 428, and 432 described herein and shown in FIG. 4 illustrates another type of computer-readable storage media, namely computer readable, machine readable, or processor readable, storage media. Computer readable storage media may include volatile, nonvolatile, removable, and non-removable media implemented in any method or technology for storage of information, such as computer readable instructions, or machine-readable instructions, data structures, program modules, or other data, which may be obtained and/or executed by at least one central processing unit 412 to perform one or more portions of the processes described below in more detail in conjunction with FIGS. 5-6. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer executable instructions, and which can be accessed by a computing device.

The mass memory may also store other types of program code and data as applications 450, which may be are loaded into mass memory and run on operating system 420. Examples of application 450 may include email client/server programs, routing programs, schedulers, web servers, calendars, database programs, word processing programs, HTTP programs, RTSP programs, security programs, and any other type of application program. Applications 450 may also include traffic manager 456. In one embodiment, traffic manager 456 may include LBUI 458. However, the invention is not so limited. For example, in another embodiment, LBUI 458 may be configured as a separate component from traffic manager 456.

In one embodiment, ram 416 may include data store 452; however, data store 452 may also reside completely, or in part, in another mass memory storage media, including, but not limited to a storage device readable by cd-rom/dvd-rom drive 426, on hard disk drive 428, or even on a computer readable storage medium on another network device and possibly accessible by network device 200 through such as network interface unit 410.

Data store 452 may include virtually any mechanism configured and arranged to store data and/or computer readable instructions. As such, data store 452 may be configured to store and/or otherwise manage data associated with information about configurations of a plurality of network devices, a plurality of resource pools, intrusion detection systems, or the like.

Traffic manager 456 is configured and arranged to include any component configured to manage network traffic between network devices. In one embodiment, traffic manager 456 may receive messages in the form of network packets. In one embodiment, the message may span multiple packets. In such instance, traffic manager 456 is configured to recognize packets that are associated with each other and to manage the packets as a flow of related packets.

In one embodiment, traffic manager 456 might employ provide a variety of decisions useable for managing the flow of traffic. For example, traffic manager 456 may direct a request for a resource, based on network traffic, network topology, capacity of a server, content requested, a round-robin approach, and/or a host of other load balancing mechanisms.

However, in another embodiment, traffic manager 456 might include as part of a late binding mechanism, Late Binding User Instructions (LBUI) 458 that may be configured to receive various network metrics that are exposed for use by traffic manager 456. Such network metrics may be control plane metrics and/or management plane metrics. Control plane metrics that may be exposed for use by LBUI 458 include but are not limited to status of a network device (such as whether it is able to service requests or not), number of connections currently being serviced by a network device, percent of connections closed abnormally (or normally) in a given time period, a round trip time measurement that may be based on previous connections to a network device, or the like. Management plane metrics that may be exposed for use by LBUI 458 include but are not limited to an IP address and/or service port of a network device (or other unique identifier), whether sending requests to a network device is enabled or disabled, a desired ratio of requests for a network device, a maximum number of concurrent connections allowed to be serviced by a network device, or the like.

Exposure of the various network metrics may be performed using a variety of mechanisms. For example, in one embodiment, traffic manager 456 may collect and/or calculate the various network metrics, and then expose them to LBUI 458 through an Application Programming Interface (API). In another embodiment, traffic manager 456 may expose the network metrics by providing them in a table, a shared memory location, or the like. Such network metrics are typically not provided to applications beyond traffic manager 456. Thus, traffic manager 456 is configured to expose such metrics which might not otherwise be made accessible to LBUI 458.

LBUI 458 may employ such metrics, as well as others, along with data plane data to perform some action. As a non-limiting example, LBUI 458 may be configured LBUI 458 to manage load-balancing of a plurality of network devices using an election hash. LBUI 458 may examine requests for content from a client device, and extract application layer data, as well as other data useable as request specific data. In one embodiment LBUI 458 may perform deep packet inspections using an inspection engine component, or the like, to extract data from a request. LBUI 458 may select the extracted data based on a type of network device the request is to be forwarded. For example, where the network device is an intrusion detection network device, LBUI 458 might include in the request specific data, data about the client address, source address, or the like. Where the request is to be sent to a cache server device, LBUI 458 might select to exclude client specific data, such as a client address, source address, or the like, in the request specific data. Thus, in one embodiment, the request specific data might vary as a function of a network device being load-balanced for persistence.

LBUI 458 may combine the request specific data with each of a plurality of network device identifiers to generate a plurality of hash values, where such network device identifiers may represent one example of network metrics exposed by traffic manager 456. LBUI 458 may employ any of a variety of hashing functions to generate the hash values, including but not limited to Message Digest (MD) algorithms including but not limited to MD-2, MD-5; Secure Hash Algorithm (SHA), hash tables, or the like, as well as cyclic redundancy check (CRC) algorithms, such as CRC-32, or the like.

LBUI 458 may compare the resulting hash values and elect an associated network device based on the comparison. For example, LBUI 458 might elect an associated network device having a highest (largest) resulting hash value. However, in another embodiment, LBUI 458 might elect an associated network device having a lowest (smallest) resulting hash value. LBUI 458 might then direct traffic manager 456 to forward the request to the elected network device.

Where the plurality of network devices may be distributed across a plurality of resource pools, LBUI 458 may employ the request specific data to select a resource pool from which to then elect a network device. For example, in one embodiment, LBUI 458 might perform a hash and modulo calculation on the request specific data. A result of the calculation might then be employed to select the resource pool. However, the invention is not so limited, and other hashing mechanisms might also be used to select the resource pool. For example, a hash of a combination of the request specific data and a resource pool identifier might be performed for each resource pool in the plurality of resource pools. Then the results may be compared, and a highest or lowest resulting value might then be used to identify a plurality of associated network devices for which a network device may then be elected from. However, LBUI 458 may also be used to select a network device based on a variety of other criteria, and therefore is not restricted to those described above. For example, in one embodiment, LBUI 458 might randomly select a network device for which to service a request from a client device.

Although LBUI 458 is illustrated as a component within traffic manager 456, the invention is not so limited. For example, LBUI 458 might be a distinct component from traffic manger 456 that is executed distinct from traffic manager 456 as appropriate to perform user-customized actions in response to a request for a resource.

Network device 400 may also include an SMTP handler application for transmitting and receiving e-mail, an HTTP handler application for receiving and handing HTTP requests, a RTP handler application for receiving and handing RTP requests, an SIP requests and/or responses, and an HTTPS handler application for handling secure connections. The HTTPS handler application may initiate communication with an external application in a secure fashion. Moreover, network device 400 may further include applications that support virtually any secure connection, including TLS, TTLS, EAP, SSL, IPSec, and the like.

Network device 400 may also include input/output interface 424 for communicating with external devices, such as a mouse, keyboard, scanner, or other input/output devices not shown in FIG. 4. Likewise, network device 400 may further include additional mass storage facilities such as cd-rom/dvd-rom drive 426 and hard disk drive 428. Hard disk drive 428 may be utilized to store, among other things, application programs, databases, and the like in the same manner as the other mass memory components described above.

In one embodiment, the network device 400 may include at least one Application Specific Integrated Circuit (ASIC) chip (not shown). The ASIC chip can include logic that performs some or all of the actions of network device 400. For example, in one embodiment, the ASIC chip can perform a number of packet processing functions for incoming and/or outgoing packets. In one embodiment, the ASIC chip can perform at least a portion of the logic to enable the operation of traffic manager 456, LBUI 458, or any other components.

In one embodiment, network device 400 can further include one or more field-programmable gate arrays (FPGA) (not shown), instead of, or in addition to, the ASIC chip. A number of functions of network device 400 can be performed by the ASIC chip, the FPGA, by CPU 412 with instructions stored in memory, or by any combination of the ASIC chip, FPGA, and a CPU.

Generalized Operation

Figure 8:
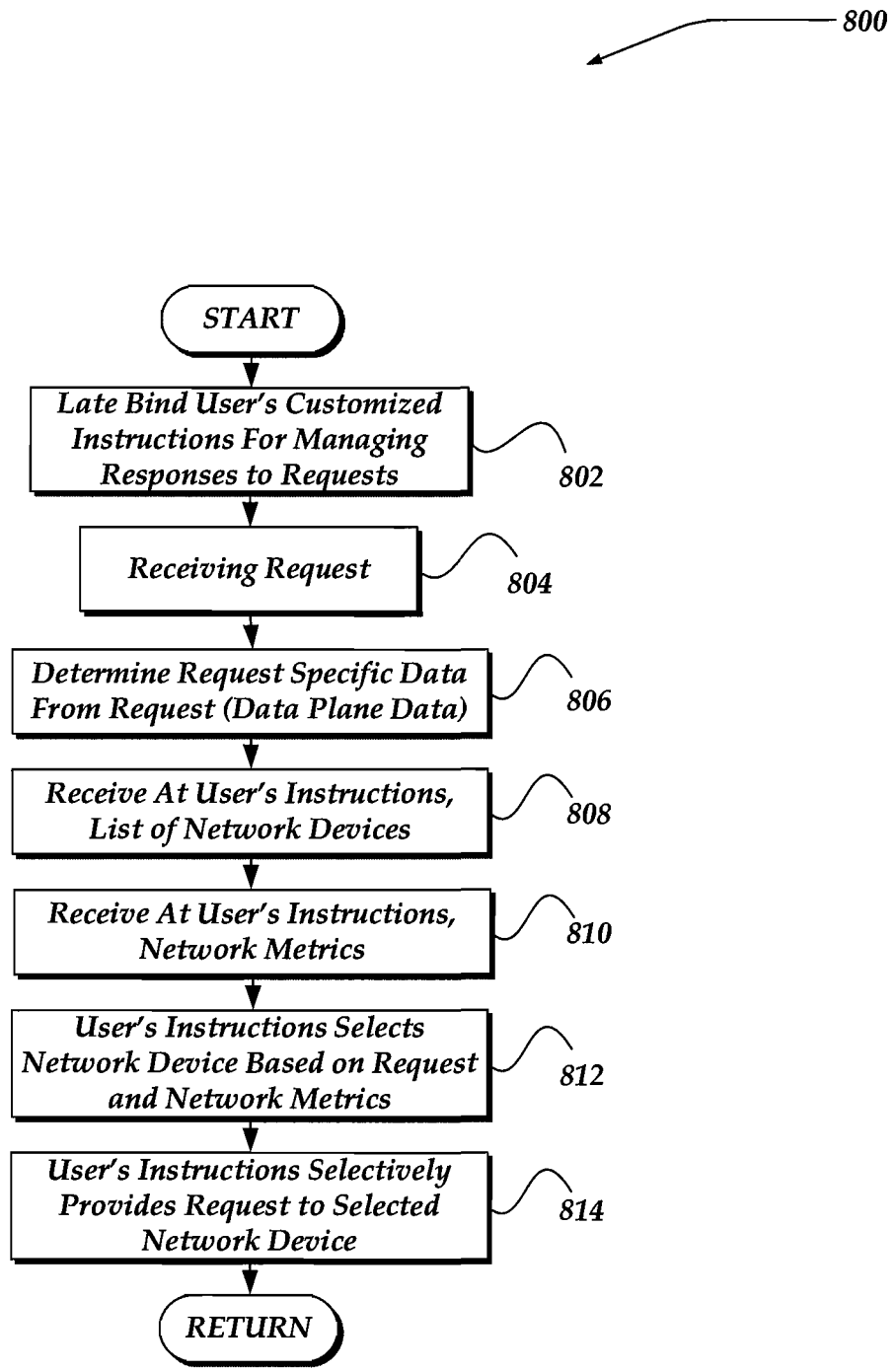
FIG. 8 illustrates a logical flow diagram generally showing one embodiment of an overview process for selectively providing a request to a network device using a late binding user customized set of instructions and exposed network metrics.

The operation of certain aspects of the invention will now be described with respect to FIGS. 5-6, and 8. FIG. 8 illustrates a logical flow diagram generally showing one embodiment of a process for selectively providing a request to a network device using a late binding user customized set of instructions and exposed network metrics.

Process 800 of FIG. 8 begins, after a start block, at block 802 where a user's customized set of instructions useable for managing responses to a request for a resource may be implemented using a late binding mechanism. That is, at some late stage after implementing a traffic manager application that exposes selective network metrics the user may bind a set of instructions.

Processing flows next to block 804, where a request for a resource is received. For example, a client device, such as client devices 101-104 of FIG. 1 may send over network 105 a request for a resource. The resource might be, for example, a web page, a document, access to an application, or the like.

Processing continues next to block 806, where request specific data may be extracted from the request. In one embodiment, a deep packet inspection might be performed on the request packet(s) to obtain various data plane request specific data.

Flowing next to block 808, a list of network devices are provided to the user' customized late binding instructions. In one embodiment, such list might be included as part of a set of exposed management plane network metrics. Continuing next to block 810, various other network metrics, including various control plane and/or management plane data are exposed for use by the user's customized late binding set of instructions.

Process 800 continues to block 812, where the user's customized instructions may then selects one or more of the exposed network metrics to perform an analysis for managing the request. Continuing to block 814, the user's instructions then, based on the analysis, selectively provides the request to zero or more network devices. Processing then returns to a calling process to perform other actins.

As may be seen, process 800 provides a general overview process for managing requests for a resource through late binding instructions using exposed network metrics. However, more specific, although non-limiting examples are provided next.

Figure 5:
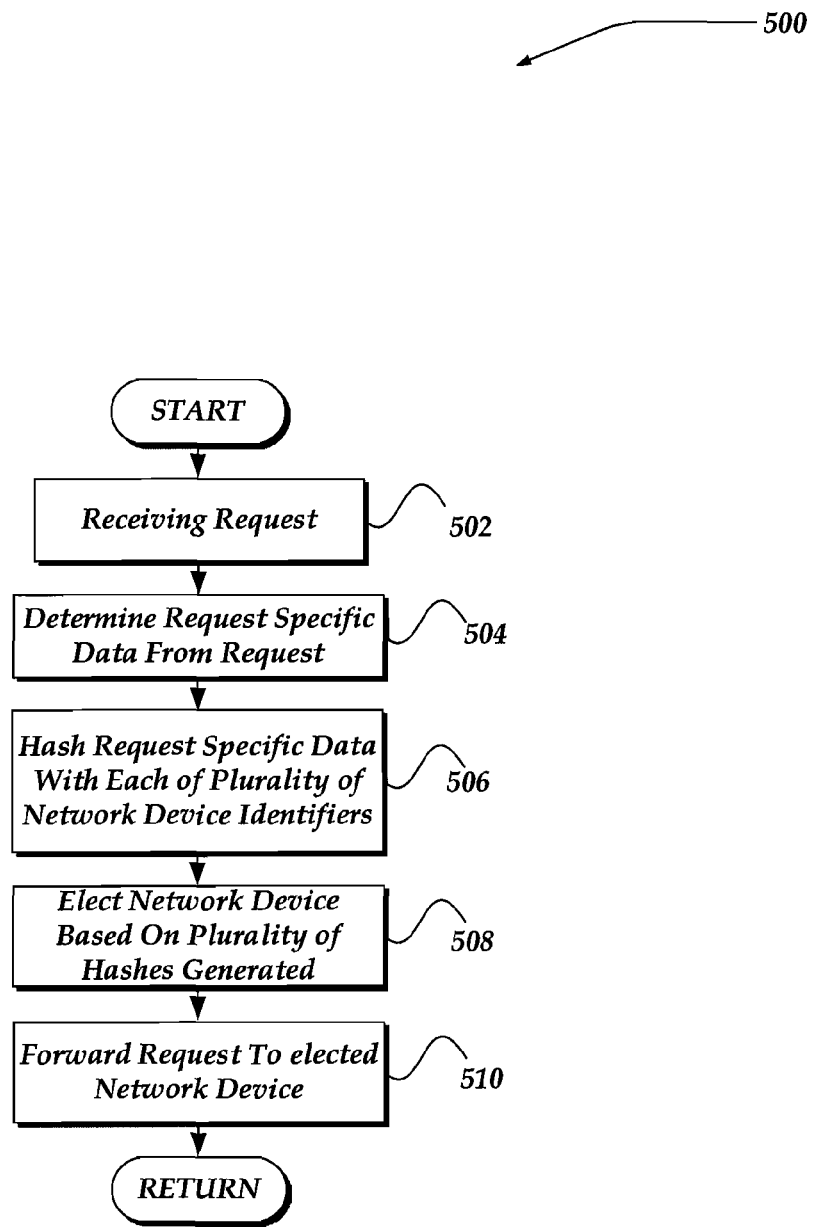
FIG. 5 illustrates a logical flow diagram generally showing one embodiment of a process for electing a network device to manage a request based on using an election hash.

Thus, FIG. 5 illustrates a logical flow diagram generally showing one embodiment of a process for electing a network device to manage a request based on using an election hash. Process 500 of FIG. 5 may be implemented within TMD 106 of FIGS. 1-3. FIG. 5 illustrates a non-exhaustive example of employing a user's late binding customized set of instructions to perform election hashing. In this instance, the management plane data employed includes network addresses of the network devices, while the exposed network metrics include a list of available network devices, and their unique identifiers.

Process 500 begins, after a start block, at block 502, where a request for content is received. Processing flows next to block 504, where request specific data is extracted from the request. In one embodiment, a deep packet inspection might be performed to extract the request specific data. In one embodiment, the request specific data is extracted based on a type network device for which the request is to be forwarded, such as described above.

Processing continues to block 506, where a plurality of hash values is determined based on a combination of the request specific data with each of a plurality of network device identifiers (e.g., management plane data). In one embodiment, the network device identifiers are network device IP addresses. However, the invention is not so limited and other identifiers (and/or other management plane and/or control plane data) may also be used. In one embodiment, the request specific data may be combined with the network device identifiers may concatenating the data and identifiers. However, other mechanisms for combining the data and identifiers may also be used, including, without limit, exclusive or'ing the data with the identifiers, algorithmically summing the data with the identifiers, or the like.

Process 500 flows next to block 508, where a target network device may then be elected based on a comparison of the resulting hash values. In one embodiment, the network device with a highest (or lowest) hash value might be elected. However, other election mechanisms may also be used, without departing from the scope of the invention. Processing then flows to block 510, where the request is forwarded to the elected network device. Process 500 then returns to a calling process to perform other actions.

Figure 6:
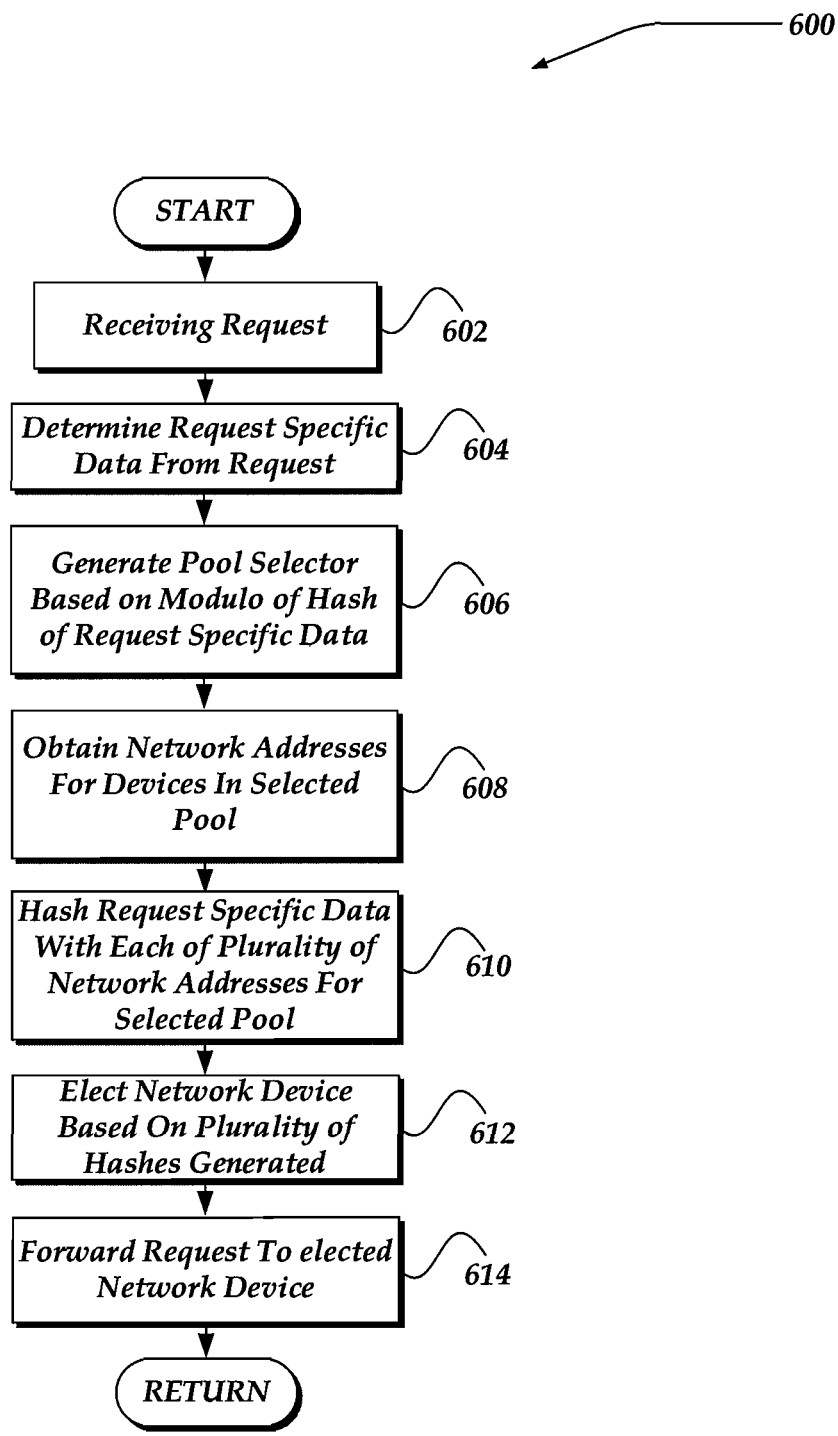
FIG. 6 illustrates a logical flow diagram generally showing one embodiment of a process for electing a network device to manage a request based on using an election hash across a plurality of resource pools.

FIG. 6 illustrates a logical flow diagram generally showing one embodiment of a process using another late binding customized set of instructions for selecting a network device to manage a request based on using an election hash across a plurality of resource pools. Requests per second may be directly affected by a number of available network devices within the plurality of network devices for which the election hashing approach is applied. In order to improve further, therefore, upon scalability, several approaches may be used. Process 600 of FIG. 6 provides one non-exhaustive process useable for performing election hashing through a late binding user customized set of instructions. As shown in FIG. 2, above, the plurality of network devices may be distributed among a plurality of resource pools, each resource pool may be associated with a resource pool identifier.

Then, in one embodiment, process 600 begins after a start block, at block 602, where a request for a resource is received from a client device. Processing continues next to block 604, where request specific data is extracted from the request substantially similar to block 504 of process 500 described above.

Processing continues to block 606, where a pool selector value is generated based on a modulo of a hash of the request specific data. That is, in one embodiment, the request specific data might be hashed. Then, for example, where the number of resource pools are ten or less, a modulo calculation may be performed on the hash value to generate a value from zero to nine. The resource pool associated with the resulting pool selector value may then be used to provide a plurality of network devices from which election hashing as described above in process 500 may then be applied.

However, the invention is not limited to the above approach, and other mechanisms may also be applied to select the resource pool of network devices. For example, in another embodiment, the election hashing approach might be applied to elect the resource pool at block 606. That is, the request specific data might be combined with each of the plurality of resource pool identifiers. A comparison may then be made of resulting hashes for the combinations, and based on the comparison one of the resource pools may be elected.

In any event, processing flows to block 608, where the plurality of network devices for the selected resource pool are then used to elect the network device for which the request is to be sent. Thus, in one embodiment, the network device identifiers for each of the network devices in the plurality may be obtained.

Processing continues to block 610, where hash values are obtained from the combination of the request specific data with each of the plurality of network device identifies, as described above in process 500.

Process 600 continues to block 612, where based on the resulting hash values one of the network devices within the selected resource pool is elected, and flowing to block 614, the request is sent to the elected network device. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Non-Exhaustive Example

Figure 7:
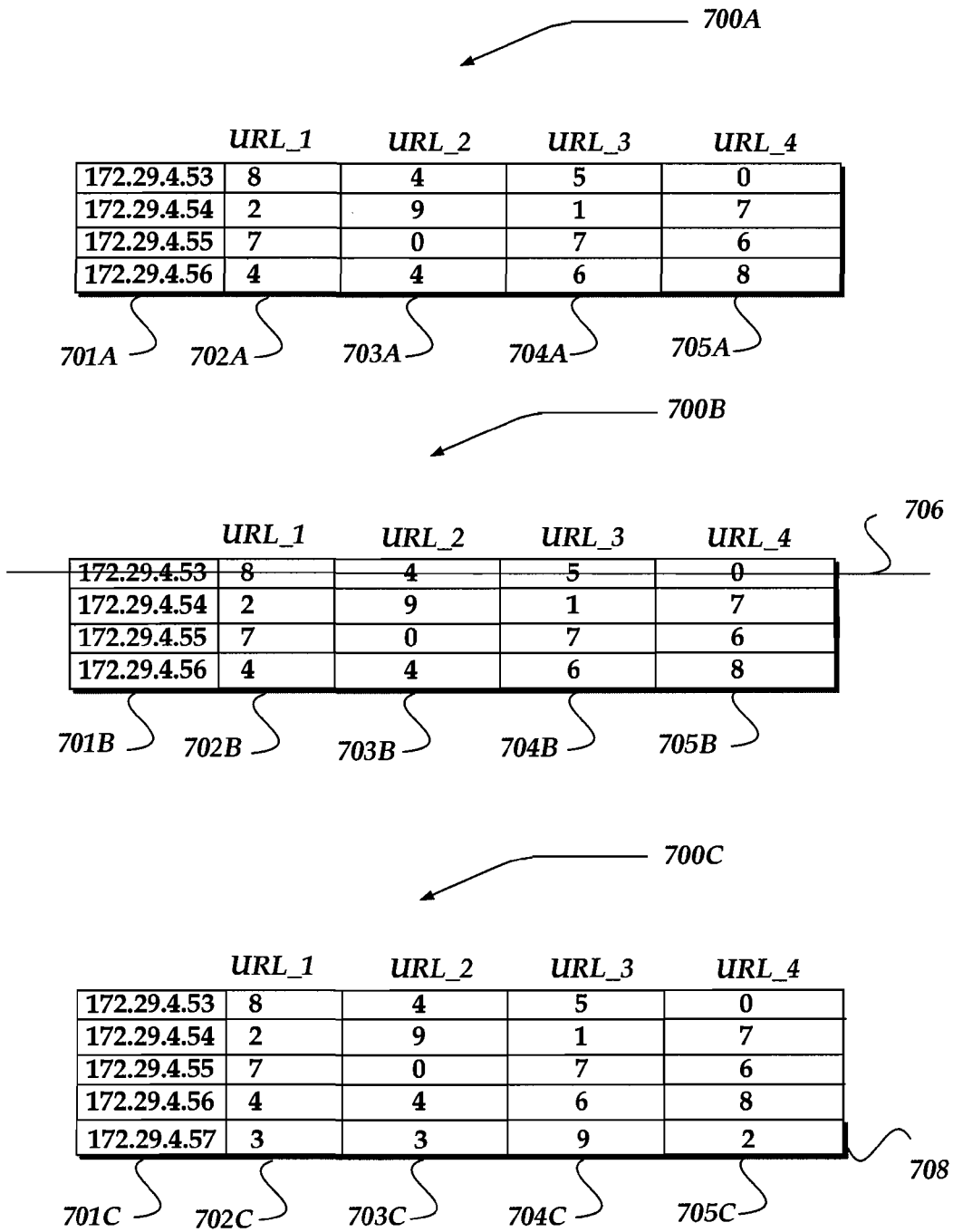
FIG. 7 illustrates one non-exhaustive examples of an election scheme based on hashes of user requested data and network device identifiers.

FIG. 7 illustrates one non-exhaustive examples of an election scheme based on hashes of user requested data and network device identifiers. Instead of performing calculations to select a network device based on a position of the network device in a list of network devices, the present invention is directed towards electing a network device independent of its position within the list. As described above, the election is performed based on request specific data and a network device identifier.

As shown in example 700A of FIG. 7, five network identifiers 701A are illustrated. Columns 702A-705A represent hash value results based on different request specific data. As shown, for illustrative purposes, the request specific data in 700A include URL_1, URL_2, URL_3, and URL_4. As described above, a hash may be performed on the combination of the request specific data with each of the five network identifiers. Illustrative hash value results are shown for URL_1, as 8, 2, 7, and 4 for each of the respective five network identifiers 701A. Similar illustrative hash value results are shown for URL_2, URL_3, and URL_4.

As may be seen a given network device will always attain a same score for a unique request specific data regardless of its order within the list of network devices. This calculation may be performed for every network device with the plurality of available network devices, using the unique network identifier and request specific data, with the request from the client device being sent to the elected network device based on a comparison of the hash results. Thus, as shown in example 700A, the request for URL_1 would go to the first network device (identifier: 172.29.4.53), while the request for URL_2 would go to the second network device (identifier: 172.29.4.54); the request for URL_3 would go to the third network device (identifier: 172.29.4.55); and the request for URL_4 would go to the fourth network device (identifier: 172.29.4.56).

As seen in example 700B, the first network device 706 (identifier: 172.29.4.53) is removed from the plurality of available network devices. However, the calculation need not change, so that each remaining network device would still obtain the same hash value results. The request for URL_1, however, can not be won by the now removed first network device 706 (identifier: 172.29.4.53), so the next highest hash value from the third network device (identifier: 172.29.4.55) would receive the request. Thus, the only traffic shift in requests occurs based on requests that were sent previously to the now removed first network device. Requests for the other request specific data remain unaffected by the change in the available network device. Such actions are directed towards minimizing disruptions in network devices rippling through all of the remaining network devices.

Similarly, as shown in example 700C when a new network device 708 is added to the plurality of network devices, it too may then participate in the election system. As seen, the new network device 708 might assume request specific requests for which its hash wins. As may be seen, such election hashing approach may readily scale almost infinitely to a number of unique requests that can be made by a client device. Further, membership to a plurality of network devices may change by adding, removing, enabling and/or disabling a network device, with minimum effect on the remaining network devices other than the assumption of relinquishment of its portion of network traffic.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A traffic manager device for managing communications over a network, comprising:
   a memory that stores data and instructions;
   an input interface that receives requests and sends responses; and
   a processor that performs actions embodied by at least a portion of the stored instructions, the actions comprising:
      receiving a request from a client device for a resource;
      obtaining a list of a plurality of network devices in response to receiving the request;
      exposing at least one metric about the plurality of network devices identified in the list, wherein the at least one metric is a control plane or a management plane metric, the management plane metric being a measure of at least one aspect of the network of operations, administration, maintenance, or provisioning of network traffic;
      providing access to the at least one metric for use in a late binding user customized set of instructions configured to perform an action further based on the request, where late binding of the user customized set of instructions with the stored instructions assigns values to symbolic placeholder at least after execution of the stored instructions starts; and
      wherein the late binding user customized set of instructions perform actions, comprising:
         combining request specific data with each of a plurality of different identifiers, each identifier being associated with a different network device in the plurality of network devices, and wherein the identifiers represent an exposed metric;
         generating a plurality of hash values based on the plurality of combinations;
         selecting a network device based on an evaluation of the generated plurality of hash values; and
         forwarding the request to the selected network device, such that the selected network device services the request for content.

2. The traffic manager device of claim 1, wherein the late binding user customized set of instructions are configured to combine at least one metric for each of the plurality of network devices with the request, and wherein the action performed is to select a network device from the list for which the request from the client device is sent.

3. The traffic manager device of claim 1, wherein the action performed comprises at least one of selecting a set of network devices from the list to send the request to, dropping the request if the late binding set of instructions determines based on the exposed metrics that the list is empty indicating that no network device is currently available, or delaying the request until a network device is available to send the request to.

4. The traffic manager device of claim 1, wherein data from within the request is used to further perform the action, wherein the data within the request comprises at least one of a Universal Resource Identifier (URI), host name, path name, cookie, or client address.

5. The traffic manager device of claim 1, wherein the late binding user customized set of instructions configured to perform an action, comprising:
assigning the network devices in the plurality of network devices among different pools in a plurality of pools;
determining a modulo value from a hash of request specific data;
employing the determined modulo value to select a pool from the plurality of pools; and
employing a plurality of identifiers, each identifier being associated with a different network device in the selected pool of network devices.

6. The traffic manager device of claim 1, wherein the plurality of network devices are associated with intrusion detection devices, and wherein request comprises information associated with a client device requesting the content.

7. A non-transitory, machine-readable storage medium having machine-executable instructions stored thereon, which when executed by at least one processor that is interposed between client devices and a plurality of network devices, causes the at least one processor to perform one or more actions to manage communications over a network, comprising:
receiving a request for content;
extracting request specific data from the request for content;
exposing a plurality of network metrics to a late binding user-customized set of script instructions, the late binding of the user-customized set of script instructions occurring at least after execution of the machine-executable instructions starts; and
executing the late binding instructions to:
combine request specific data with each of a plurality of different identifiers, each identifier being associated with a different network device in the plurality of network devices, and wherein the identifiers represent an exposed metric;
generate a plurality of election hashes based on the plurality of combinations, wherein the combinations include the request specific data with at least one exposed network metric associated with the plurality of network devices;
elect one of the plurality of network devices based on a comparison of the generated plurality of election hashes, and
selectively forward the request for content to the elected network device such that the selected network device can provide the requested content.

8. The non-transitory, machine-readable storage medium of claim 7, wherein the late binding user-customized instructions performs one or more actions further comprising:
allocating the plurality of network devices among a plurality of resource pools; and
electing one of the resource pools from which the network device is elected based on a modified election hash.

9. The non-transitory, machine-readable storage medium of claim 7, wherein electing based on the generated plurality of election hashes further comprises selecting at least one of a highest election hash value or a lowest election hash value.

10. The non-transitory, machine-readable storage medium of claim 7, wherein the request specific data further comprises at least one of a Uniform Resource identifier (URI), a cookie, a host identifier, or a path name.

11. The non-transitory, machine-readable storage medium of claim 7, wherein election of one of the plurality of network devices is independent of a position of the selected network device within a list of the plurality of network devices.

12. The non-transitory, machine-readable storage medium of claim 7, wherein the request specific data further comprises an identifier associated with a requesting client device; and wherein an Application Programming Interface (API) is employed to select the request specific data to be extracted from the request.

13. A system for managing communications over a network, comprising:
a plurality of network devices, wherein the plurality of network devices are distributed among a plurality of resource pools; and
a traffic manager device that is interposed between the plurality of application servers and client devices, and is configured to perform actions, including:
receiving a request from a client device for a resource;
extracting request specific data from the request;
exposing a plurality of network metrics, wherein at least one network metric is associated with a control plane or a management plane; and
executing a late binding user-customized script that is configured to perform actions, the late binding of the user-customized script occurring with instructions executed by the traffic manager device at least after a start of execution of the instructions, including:
combining request specific data with each of a plurality of different identifiers, each identifier being associated with a different network device in the plurality of network devices, and wherein the identifiers represent an exposed metric;
generating a first election hash from the plurality of combinations of the request specific data;
employing the first election hash to elect a resource pool from the plurality of resource pools;
generating a plurality of second election hashes from the plurality of combinations of the request specific data and at least one exposed network metric for each of the plurality of network devices associated with the elected resource pool;
electing a network device from within the associated plurality of network devices based on the plurality of second election hashes; and
selectively forwarding the request for the resource to the elected network device, such that the selected network device provides the resource to the client device.

14. The system of claim 13, wherein generating the first election hash further comprises performing a hash function on the request specific data, followed by performing a modulo calculation to generate the first election hash.

15. The system of claim 13, wherein generating each of the plurality of second election hashes further comprises:
combining the request specific data with a network identifier for each respective network device in the plurality of network devices; and
performing a hash on each of the combinations to generate the plurality of second election hashes.

16. A method of managing a request for a managing communications over a network, comprising:
receiving a request from a client device for a resource;
extracting request specific data from the request;
exposing at least one network metric to a late binding user-customized script, the late binding of the user-customized script with instructions for executing the method occurring at least after execution of the instructions starts, wherein the at least one network metric is a control plane or a management plane associated metric about a plurality of network devices; wherein the late binding user customized script with instructions perform actions, comprising:

combining request specific data with each of a plurality of different identifiers, each identifier being associated with a different network device in the plurality of network devices, and wherein the identifiers represent an exposed metric;

generating a plurality of election hashes based on the plurality of combinations from the request specific data and the at least one network metric about the plurality of network devices; selectively electing a network device from within the plurality of network devices based on an evaluation of the generated plurality of hash values; and forwarding the request for the resource to the elected network device.

17. The method of claim 16, further comprising:
selecting the plurality of network devices by:

identifying a plurality of resource pools, each resource pool including a plurality of different network devices;

generating a modulo of a hash from the request specific data; and employing the generated modulo to select a resource pool from the plurality of resource pools, wherein the selected resource pool identifies the plurality of network devices from which to elect the network device for providing the resource to the client device.

18. The method of claim 16, wherein an application programming interface (API) is employed to extract from the request the request specific data, wherein the request specific data is extracted by performing a deep packet inspection at or above layer 5 of the OSI layered stack.

19. The method of claim 16, wherein the plurality of network devices are configured as intrusion detection devices, the request specific data comprises at least one of a client device identifier, and the intrusion detection device is further configured to a response to the request from another network device.

\* \* \* \* \*